US012699108B2

(12) United States Patent
Yin

(10) Patent No.: US 12,699,108 B2
(45) Date of Patent: Aug. 4, 2026

(54) METHOD AND APPARATUS FOR MONITORING CONCENTRATION OF REAGENT, ELECTRONIC DEVICE, AND COMPUTER READABLE STORAGE MEDIUM

(71) Applicant: LEICA BIOSYSTEMS NUSSLOCH GMBH, Nussloch (DE)

(72) Inventor: Li Yin, Shanghai (CN)

(73) Assignee: LEICA BIOSYSTEMS NUSSLOCH GMBH, Nussloch (DE)

( * ) Notice: Subject to any disclaimer, the term of this patent is extended or adjusted under 35 U.S.C. 154(b) by 803 days.

(21) Appl. No.: 18/018,287

(22) PCT Filed: Jul. 31, 2020

(86) PCT No.: PCT/CN2020/106115
§ 371 (c)(1),
(2) Date: Jan. 27, 2023

(87) PCT Pub. No.: WO2022/021289
PCT Pub. Date: Feb. 3, 2022

(65) Prior Publication Data
US 2023/0258668 A1 Aug. 17, 2023

(51) Int. Cl.
*G01N 35/00* (2006.01)
*G01N 35/10* (2006.01)

(52) U.S. Cl.
CPC ... *G01N 35/00663* (2013.01); *G01N 35/1002* (2013.01); *G01N 2035/00673* (2013.01); *G01N 2035/00891* (2013.01)

(58) Field of Classification Search
None
See application file for complete search history.

(56) References Cited

U.S. PATENT DOCUMENTS

2007/0243626 A1    10/2007  Windeyer et al.
2011/0041599 A1     2/2011  Ulbrich et al.
(Continued)

FOREIGN PATENT DOCUMENTS

CN    102262068 A    11/2011
CN    102735854 A    10/2012
(Continued)

OTHER PUBLICATIONS

Extended European Search Report for European Patent Application No. 20947357.8, dated Apr. 23, 2024, 10 pages.
(Continued)

*Primary Examiner* — Jyoti Mutreja
(74) *Attorney, Agent, or Firm* — Kinney & Lange, P.A.

(57) ABSTRACT

This disclosure relates to a method and an apparatus for monitoring a concentration of a reagent, an electronic device, a computer-readable storage medium. The method includes: acquiring a first concentration of a current reagent measured during filling of the current reagent with a preset concentration; acquiring a current volume of carryover determined in filling and draining a previous reagent; acquiring a second concentration of the current reagent measured during draining of the current reagent and determining, based on the preset concentration, a volume of the reagent bottle and the current volume of carryover, a third concentration of the current reagent; updating the current volume of carryover based on the first concentration, the second concentration and the volume of the reagent bottle; and when the third concentration is less than a preset concentration limit, reminding to replace the current reagent and/or refreshing the current reagent with a higher concentrated reagent.

18 Claims, 3 Drawing Sheets

(56)         References Cited

U.S. PATENT DOCUMENTS

| | | | |
|---|---|---|---|
| 2019/0265187 | A1 | 8/2019 | Kishioka et al. |
| 2020/0174029 | A1 | 6/2020 | Sears et al. |
| 2022/0034924 | A1 | 2/2022 | Zhang et al. |

FOREIGN PATENT DOCUMENTS

| | | | |
|---|---|---|---|
| CN | 103926135 | A | 7/2014 |
| CN | 105067545 | A | 11/2015 |
| CN | 111141564 | A | 5/2020 |
| CN | 111373263 | A | 7/2020 |
| DE | 102014111507 | A1 | 2/2016 |
| JP | 2018017543 | A | 2/2018 |

OTHER PUBLICATIONS

Notice of Reasons for Refusal for Japanese Patent Application No. 2023-504825, dated Aug. 23, 2024, 8 pages.
Notice of Reasons for Refusal for Japanese Patent Application No. 2023-504825, dated Jan. 23, 2024, 6 pages.
First Chinese Office Action for Chinese Patent Application No. 202080104501.8, dated May 1, 2025, 10 pages.

METHOD AND APPARATUS FOR MONITORING CONCENTRATION OF REAGENT, ELECTRONIC DEVICE, AND COMPUTER READABLE STORAGE MEDIUM

CROSS-REFERENCE TO RELATED APPLICATIONS

The present application is a national phase entry under 3USC § 371 of International Application PCT/CN2020/106115, filed Jul. 31, 2020, the entire disclosure of which is incorporated herein by reference.

TECHNICAL FIELD

The present disclosure relates to a field of tissue processing technologies, and more particularly, to a method for monitoring a concentration of a reagent, an apparatus for monitoring a concentration of a reagent, an electronic device and a computer readable storage medium.

BACKGROUND

When used for tissue processing, a reagent needs to meet a certain concentration level, such that it is an important job to monitor a concentration of the reagent. However, during the tissue processing, since the reagent is usually filled in or drained out from a container, which causes carryover left in the container, the concentration may be changed, such that it is difficult to obtain the accurate concentration of the reagent.

SUMMARY

Embodiments of the present disclosure provide a method for monitoring a concentration of a reagent, an apparatus for monitoring a concentration of a reagent, an electronic device for monitoring a concentration of a reagent and a computer readable storage medium, which may monitor reagent purity in real time to remind user to replace the reagent in time, thus improving a quality of tissue processing.

In a first aspect of embodiments of the present disclosure, a computer-implemented method for monitoring a concentration of a reagent is provided. The method includes: acquiring a first concentration of a current reagent measured during filling of the current reagent with a preset concentration from a reagent bottle into a vessel via a liquid path; acquiring a current volume of carryover left in the vessel and the liquid path determined in a process of filling a previous reagent into the vessel and draining the previous reagent out from the vessel; acquiring a second concentration of the current reagent measured during draining of the current reagent from the vessel to the reagent bottle via the liquid path, and determining, based on the preset concentration, a volume of the reagent bottle and the current volume of carryover, a third concentration of the current reagent after the current reagent is drained out from the vessel to the reagent bottle; updating the current volume of carryover left in the vessel and the liquid path based on the first concentration, the second concentration and the volume of the reagent bottle; and when the third concentration is less than a preset concentration limit, reminding a user to replace the current reagent and/or refreshing the current reagent with a higher concentrated reagent.

In an embodiment, determining, based on the preset concentration, the volume of the reagent bottle and the current volume of carryover, the third concentration of the current reagent after the current reagent is drained out from the vessel to the reagent bottle includes: after the current reagent is filled into the vessel, determining a concentration of the current reagent in the vessel based on the preset concentration, the volume of the reagent bottle and the current volume of carryover; after the current reagent is drained out from the vessel to the reagent bottle, controlling the reagent bottle to be supplemented with the current reagent having the preset concentration; and determining the third concentration of the current reagent in the reagent bottle based on the concentration of the current reagent in the vessel, the volume of the reagent bottle, the preset concentration and the current volume of carryover.

In an embodiment, the determining the concentration of the current reagent in the vessel based on the preset concentration, the volume of the reagent bottle and the current volume of carryover includes: calculating a volume of major component of the current reagent in the vessel using a formula of $Vaf=(Vb-Vco)\times Cbf$; and calculating the concentration of the current reagent in the vessel using a formula of $Caf=Vaf \div Vb$; where Vaf represents the volume of major component of the current reagent in the vessel, Vco represents the current volume of carryover, Vb represents the volume of the reagent bottle, and Cbf represents the preset concentration, Caf represents the concentration of the current reagent in the vessel.

In an embodiment, the determining the third concentration of the current reagent in the reagent bottle based on the concentration of the current reagent in the vessel, the volume of the reagent bottle, the preset concentration and the current volume of carryover includes: calculating a volume of major component of the current reagent in the reagent bottle using a formula of $Vad=(Vb-Vco)\times Caf+Vco\times Cbf$, and calculating the third concentration of the current reagent in the reagent bottle using a formula of $Cad=Vad \div Vb$; where Vad represents the volume of major component of the current reagent in the reagent bottle, Vco represents the current volume of carryover, Vb represents the volume of the reagent bottle, and Cbf represents the preset concentration, Caf represents the concentration of the current reagent in the vessel, and Cad represents the third concentration.

In an embodiment, updating the current volume of carryover left in the vessel and the liquid path based on the first concentration, the second concentration and the volume of the reagent bottle includes: calculating an updated volume of carryover using a formula of: $Vco'=(CDF-CDD)/CDF\times Vb$; and replacing the current volume of carryover with the updated volume of carryover, where Vco' represents the updated volume of carryover, CDD represents the second concentration of the current reagent, CDF represents the first concentration of the current reagent, and Vb represents the volume of the reagent bottle.

In an embodiment, the current reagent is selected from a group consisting of Ethanol and Xylene.

In a second aspect of embodiments of the present disclosure, an apparatus for monitoring a concentration of a reagent is provided. The apparatus includes a first acquiring module, configured to, acquire a first concentration of a current reagent measured during filling of the current reagent with a preset concentration from a reagent bottle into a vessel via a liquid path; a second acquiring module, configured to, acquire a current volume of carryover left in the vessel and the liquid path determined in a process of filling a previous reagent into the vessel and draining the previous reagent out from the vessel; a determining module, configured to acquire a second concentration of the current reagent measured during draining of the current reagent from the vessel to the reagent bottle via the liquid path, and determine, based on the preset concentration, a volume of the reagent bottle and the current volume of carryover, a third concentration of the current reagent after the current reagent is drained out from the vessel to the reagent bottle; an updating module, configured to update the current volume of carryover left in the vessel and the liquid path based on the first concentration, the second concentration and the volume of the reagent bottle; and a reminding module, configured to remind a user to replace the current reagent when the third concentration is less than a preset concentration limit and/or a refreshing module, configured to refresh the current reagent with a higher concentrated reagent.

In an embodiment, the determining module includes a first determining unit, configured to, after the current reagent is filled into the vessel, determine a concentration of the current reagent in the vessel based on the preset concentration, the volume of the reagent bottle and the current volume of carryover; a control unit, configured to, after the current reagent is drained out from the vessel to the reagent bottle, control the reagent bottle to be supplemented with current reagent having a preset concentration; and a second determining unit, configured to determine the third concentration of the current reagent in the reagent bottle based on the concentration of the current reagent in the vessel, the volume of the reagent bottle, the preset concentration and the current volume of carryover.

In an embodiment, the first determining unit includes a first calculating sub module, configured to calculate a volume of major component of the current reagent in the vessel using a formula of $Vaf=(Vb-Vco)\times Cbf$, and a second calculating sub module, configured to calculate the concentration of the current reagent in the vessel using a formula of $Caf=Vaf\div Vb$; where $Vaf$ represents the volume of major component of the current reagent in the vessel, $Vco$ represents the current volume of carryover, $Vb$ represents the volume of the reagent bottle, and $Cbf$ represents the preset concentration, $Caf$ represents the concentration of the current reagent in the vessel.

In an embodiment, the second determining unit includes a third calculating sub module, configured to calculate a volume of major component of the current reagent in the reagent bottle using a formula of $Vad=(Vb-Vco)\times Caf+Vco\times Cbf$, and a fourth calculating sub module, configured to calculate the third concentration of the current reagent in the reagent bottle using a formula of $Cad=Vad\div Vb$; where $Vad$ represents the volume of major component of the current reagent in the reagent bottle, $Vco$ represents the current volume of carryover, $Vb$ represents the volume of the reagent bottle, and $Cbf$ represents the preset concentration, $Caf$ represents the concentration of the current reagent in the vessel, and $Cad$ represents the third concentration.

In an embodiment, the updating module includes a third determining unit, configured to determine an updated volume of carryover using a formula of: $Vco'=(CDF-CDD)/CDF\times Vb$; and a replacing unit, configured to replace the current volume of carryover with the updated volume of carryover, where $Vco'$ represents the updated volume of carryover, $CDD$ represents the second concentration of the current reagent, $CDF$ represents the first concentration of the current reagent, and $Vb$ represents the volume of the reagent bottle.

In an embodiment, the current reagent is selected from a group consisting of Ethanol and Xylene.

In a third aspect of the present disclosure, an electronic device is provided. The electronic device includes a processor and a memory having instructions executable by the processor stored therein. When the instructions are executed by the processor, the processor is caused to perform the above method according to any of embodiments of the present disclosure.

In a fourth aspect of the present disclosure, a non-transitory computer-readable medium is provided. The computer-readable medium includes instructions executable by a processor stored therein. When the instructions are executed by the processor, the processor is caused to perform the above method according to any of embodiments of the present disclosure.

With the method and the apparatus for monitoring the concentration of the reagent, the first concentration of the current reagent measured during filling of the current reagent with the preset concentration from the reagent bottle into the vessel via the liquid path can be acquired, and the current volume of carryover left in the vessel and the liquid path determined in the process of filling the previous reagent into the vessel and draining the previous reagent out from the vessel can be acquired, then the second concentration of the current reagent measured during draining of the current reagent from the vessel to the reagent bottle via the liquid path can be acquired and the third concentration of the current reagent after the reagent is drained out from the vessel to the reagent bottle can be determined based on the preset concentration, the volume of the reagent bottle and the current volume of the carryover and the current volume of the carryover left in the vessel and the liquid path can be updated based on the first concentration, the second concentration and the volume of the reagent bottle, when the third concentration is less than the preset concentration limit, the user is reminded to replace the current reagent. In this way, the volume of the carryover left in the vessel can be updated dynamically, such that the concentration of the reagent can be determined accurately in real time to remind the user to replace the reagent in time, thus improving the quality of tissue processing.

BRIEF DESCRIPTION OF THE DRAWINGS

In order to clearly illustrate technical solutions of embodiments of the present disclosure, a brief description of drawings used in embodiments is given below. Obviously, the drawings in the following descriptions are only part embodiments of the present disclosure, and for those skilled in the art, other drawings can be obtained according to these drawings without creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
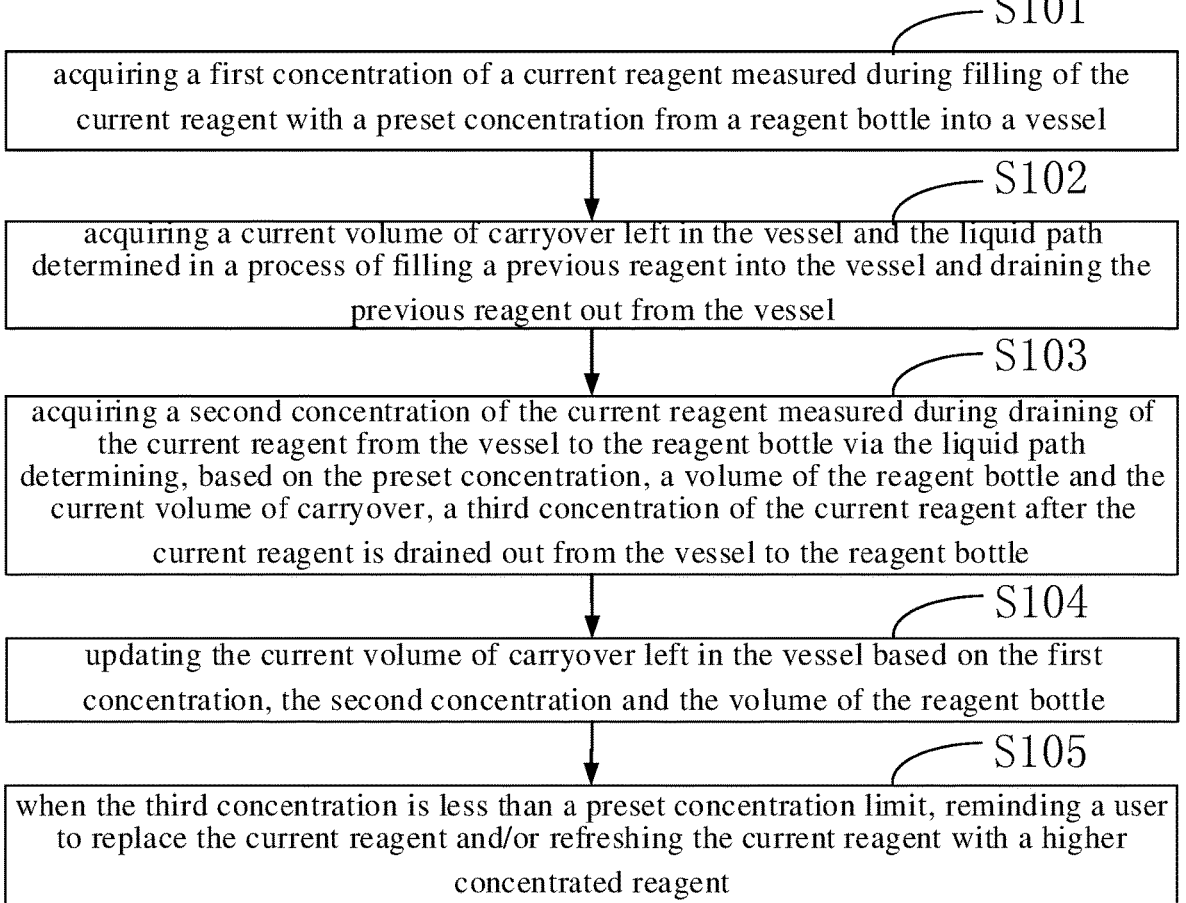
FIG. 1 is a flowchart of a method for monitoring a concentration of a reagent according to some embodiments of the present disclosure.

The embodiment of the present disclosure provides a method for monitoring a concentration of a reagent. The reagent is used for tissue processing, which may be Ethanol and Xylene. As illustrated in FIG. 1, the method includes steps 101-105.

At step S101, a first concentration of a current reagent measured during filling of the current reagent with a preset concentration from a reagent bottle into a vessel via a liquid path is acquired.

In this embodiment, while filling the reagent from the reagent bottle into the vessel via the liquid path, the concentration of the reagent can be measured by a density meter.

At step S102, a current volume of carryover left in the vessel and the liquid path determined in a process of filling a previous reagent into the vessel and draining the previous reagent out from the vessel is acquired.

While filling the reagent into the vessel and draining the reagent out from the vessel via the liquid path, it is typically that there is carryover left in the vessel and the liquid path. In a case that the vessel has carryover left therein, when a reagent is filled into the vessel and drained out from the vessel via the liquid path, the concentration of the reagent may be changed. In order to monitor the concentration of the reagent, the current volume of carryover left in the vessel and the liquid path is acquired. The current volume of carryover left in the vessel and the liquid path is caused by filling the previous reagent into the vessel and draining the pervious reagent out from the vessel via the liquid path, such that the current volume of carryover can be determined in the process of filling the previous reagent into the vessel and draining the pervious reagent out from the vessel.

At step S103, a second concentration of the current reagent measured during draining of the current reagent from the vessel to the reagent bottle via the liquid path is acquired; and based on the preset concentration, a volume of the reagent bottle and the current volume of carryover, a third concentration of the current reagent after the current reagent is drained out from the vessel to the reagent bottle is determined.

After the reagent is filled into the vessel, due to the current volume of carryover left in the vessel and the liquid path, the concentration of the reagent in the vessel is changed relative to the concentration of the reagent during the filling. Further, due to the current volume of carryover left in the vessel and the liquid path, after the reagent is drained our from the vessel into the reagent bottle via the liquid path, the concentration of the reagent now in the reagent bottle is not the same as the original concentration of the reagent in the reagent bottle.

In some embodiments, the third concentration of the current reagent after the current reagent is drained out from the vessel to the reagent bottle can be determined as follows. After the current reagent is filled into the vessel, a concentration of the current reagent in the vessel is determined based on the preset concentration, the volume of the reagent bottle and the current volume of carryover left in the vessel. After the current reagent is drained out from the vessel to the reagent bottle, the reagent bottle is supplemented with the current reagent having the preset concentration. The third concentration of the current reagent in the reagent bottle is determined based on the concentration of the current reagent in the vessel, the volume of the reagent bottle, the preset concentration and the current volume of carryover left in the vessel.

In some embodiments, after the reagent is filled into the vessel, a volume of major component of the reagent in the vessel can be determined according to a formula of:

$$Vaf=(Vb-Vco)\times Cbf$$

where Vaf represents the volume of major component of the reagent in the vessel, Vco represents the current volume of carryover left in the vessel, Vb represents the volume of the reagent bottle, and Cbf represents the preset concentration.

Based on the volume of the major component and the volume of the reagent bottle, the concentration of the reagent in the vessel can be calculated using a formula of:

$$Caf=Vaf\div Vb$$

where Caf represents the concentration of the current reagent in the vessel.

In the vessel, the reagent may be used for tissue processing. After the tissue processing, the reagent can be drained out from the vessel back to the reagent bottle, and the reagent bottle will be supplemented with the current reagent having the preset concentration to ensure that the reagent bottle is filled with the current reagent, i.e., there is the volume of the reagent bottle of the current reagent. Then the concentration of the reagent in the reagent bottle is determined as follows.

A volume of major component of the reagent in the reagent bottle is calculated using a formula of:

$$Vad=(Vb-Vco)\times Caf+Vco\times Cbf$$

where Vad represents the volume of major component of the current reagent in the reagent bottle.

The concentration of the reagent in the reagent bottle is calculated using a formula of:

$$Cad=Vad\div Vb$$

where Cad represents the concentration of the reagent in the reagent bottle.

At step S104, the current volume of carryover left in the vessel and the liquid path is updated based on the first concentration, the second concentration and the volume of the reagent bottle.

In the process of filling the reagent into the vessel and draining the reagent out from the vessel via the liquid path, the volume of carryover left in the vessel and the liquid path may be changed.

In some embodiments, after one round of filling the reagent into the vessel and draining the reagent out from the vessel via the liquid path, the current volume of carryover left in the vessel and the liquid path is replaced with an updated volume of carryover which can be determined as follows. Then during the next round of filling a reagent into the vessel and draining the reagent out from the vessel via the liquid path, the concentration of the reagent can be monitored in real time based on the updated volume of carryover.

The updated volume of carryover is determined based on the concentration of the reagent measured during the draining, the concentration of the reagent measured during the filling, and the volume of the reagent bottle. For example, the updated volume of carryover can be calculated using a formula of:

$$Vco'=(CDF\times CDD)/CDF\times Vb$$

where Vco' represents the updated volume of carryover, CDD represents the concentration of the reagent measured during the draining, CDF represents the concentration of the reagent measured during the filling, and Vb represents the volume of the reagent bottle.

The above formula can be derived using a formula of:

$$CDD=((Vco\times CW)+CDF\times(Vb-Vco))\div Vb$$

where CW represents a water concentration. Assume that CW=0, then CDD=(CDF×(Vb−Vco))÷Vb, form which the above formula can be derived.

At step S105, when the third concentration is less than a preset concentration limit, a user is reminded to replace the current reagent and/or the current reagent is refreshed with a higher concentrated reagent.

The reagent used for tissue processing needs to meet a certain concentration level, for example, the concentration of the reagent should be greater than the preset concentration limit, unless the tissue processing cannot be realized validly.

In order to ensure the effect of tissue processing, when the reagent does not meet the certain concentration level, the user may be reminded to replace the reagent with the reagent having the concentration greater than the preset concentration limit, or the reagent may be refreshed with a higher concentrated reagent.

The user may be reminded in various ways, for example, through an audio signal, a video signal, a vibration signal or other signals.

The method for monitoring the concentration of the reagent can be applied in several scenarios, for example the method can be applied in the tissue processing. During the tissue processing, the tissue hydroextractor is an important equipment for realizing dehydration of tissue, while the reagent is required during the dehydration of tissue. With the method for monitoring the concentration of the reagent, the tissue hydroextractor can monitor the concentration of the reagent used for the dehydration of tissue in real time, such that the user may be remaindered to replace the reagent at an appropriate time, thus on one hand ensuring that the concentration of the reagent meets the requirements for the dehydration of tissue, and on other hand avoiding waste of the reagent.

With the method for monitoring the concentration of the reagent, the first concentration of the current reagent measured during filling of the current reagent with the preset concentration from the reagent bottle into the vessel via the liquid path can be acquired, and the current volume of carryover left in the vessel and the liquid path determined in the process of filling the previous reagent into the vessel and draining the previous reagent out from the vessel can be acquired, then the second concentration of the current reagent measured during draining of the current reagent from the vessel to the reagent bottle via the liquid path can be acquired and the third concentration of the current reagent after the reagent is drained out from the vessel to the reagent bottle can be determined based on the preset concentration, the volume of the reagent bottle and the current volume of the carryover and the current volume of the carryover left in the vessel and the liquid path can be updated based on the first concentration, the second concentration and the volume of the reagent bottle, when the third concentration is less than the preset concentration limit, the user is reminded to replace the current reagent. In this way, the volume of the carryover left in the vessel can be updated dynamically, such that the concentration of the reagent can be determined accurately in real time to remind the user to replace the reagent in time, thus improving the quality of tissue processing.

Figure 2:
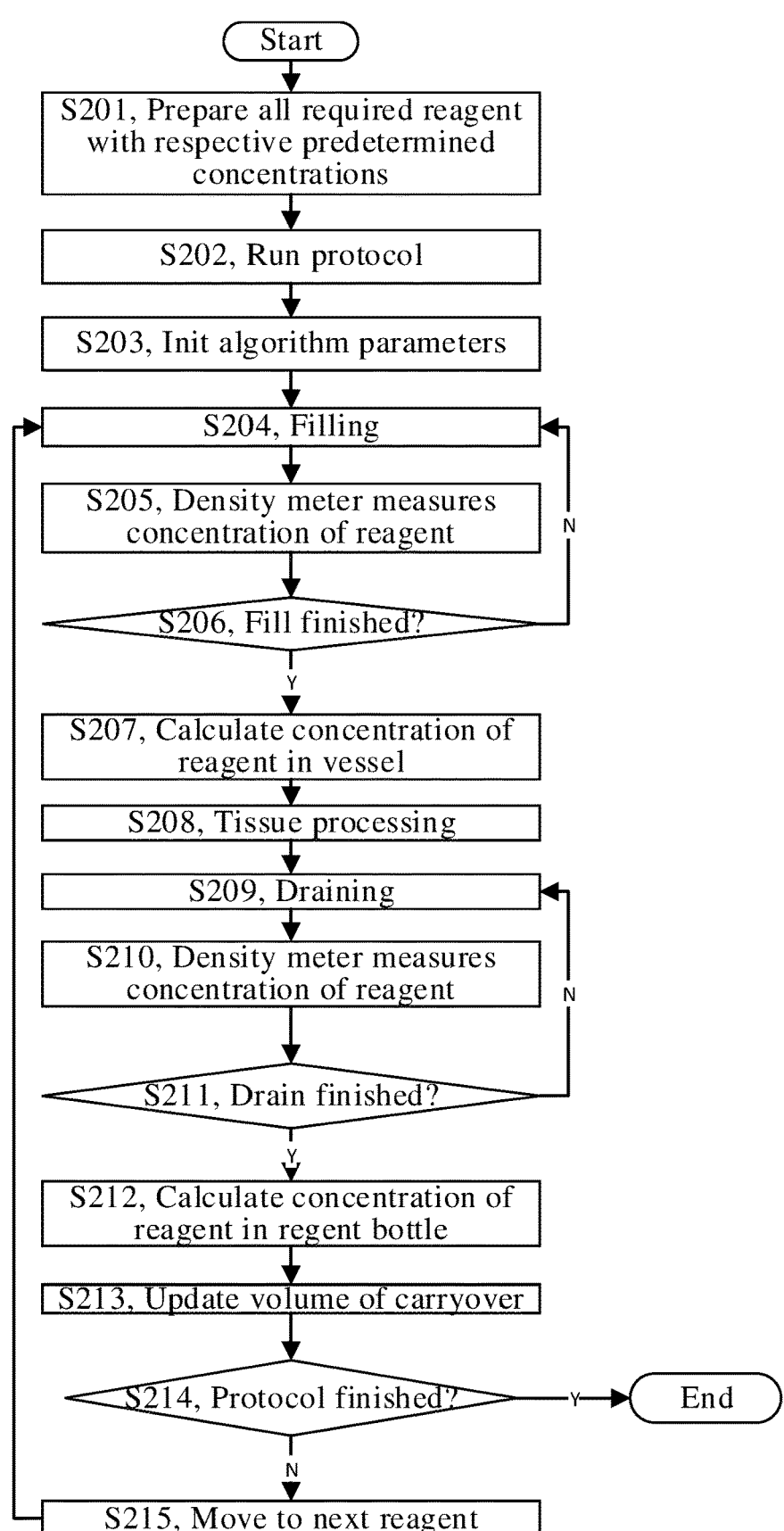
FIG. 2 is a flowchart indicating a process of obtaining a concentration of a reagent according to some embodiments of the present disclosure.

FIG. 2 is a flowchart illustrating a process of obtaining a concentration of a reagent according to some embodiments of the present disclosure.

At step S201, all required reagent with respective predetermined concentrations are prepared.

At step S202, a protocol is selected to run.

The protocol indicates how to use the reagent in tissue processing, for example, when to fill the reagent from a reagent bottle into a vessel and drain out the reagent from the vessel to the reagent bottle via a liquid path, an order of filling the reagents into the vessel and draining out the reagents from the vessel, or the like.

At step S203, algorithm parameters are initialized.

For example, a current volume of carryover left in the vessel and the liquid path is initialized to 0, and a volume of the reagent bottle is assigned according to actual situations. The algorithm parameters may be stored in a cache.

At step S204, the reagent is filled into the vessel via the liquid path according to the selected protocol.

At step S205, a concentration of the reagent during the filling is measured by a density meter during the filling of the reagent.

At step S206, it is determined whether the reagent is filled into the vessel.

At step S207, a concentration of the reagent in the vessel is calculated.

The concentration of the reagent in the vessel is calculated by using formulas of:

$$Vaf=(Vb-Vco)\times Cbf$$

$$Caf=Vaf\div Vb;$$

where Vaf represents a volume of major component of the reagent in the vessel, Vco represents the current volume of carryover, Vb represents the volume of the reagent bottle, and Cbf represents the predetermined concentration, Caf represents the concentration of the reagent in the vessel.

In the first round of the protocol, the current volume of carryover has the initial value, while in the subsequent round of the protocol, the current volume of carryover has a value determined in a round immediately previous to the current round. For example, in the first round of the protocol, a value of a volume of carryover is determined, and in the second round of the protocol, the value of the volume of carryover determined in the first round is used to calculate the concentration of the reagent.

At step S208, tissue processing is performed.

At step S209, the reagent is drained out from the vessel to the reagent bottle via the liquid path.

At step S210, a concentration of the reagent during the draining is measured by a density meter during the draining of the reagent.

At step S211, it is determined whether the reagent is drained out from the vessel.

After the reagent is drained out from the vessel to the reagent bottle, the reagent bottle is not filled with since there is carryover left in the vessel and the liquid path, then the reagent bottle is supplemented with the reagent with the predetermined concentration to ensure that the amount of reagent reaches the volume of the reagent bottle.

At step S212, a current concentration of the reagent in the reagent bottle is calculated.

The current concentration of the reagent in the reagent bottle is calculated by using formulas of:

$$Vad=(Vb-Vco)\times Caf+Vco\times Cbf,$$

$$Cad=Vad\div Vb;$$

where Vad represents the volume of major component of the reagent in the reagent bottle, Vco represents the current volume of carryover, Vb represents the volume of the reagent bottle, and Cbf represents the predetermined concentration, Caf represents the concentration of the reagent in the vessel, and Cad represents the current concentration of the reagent in the reagent bottle.

At step S213, the current volume of carryover left in the vessel and the liquid path is updated.

The current volume of carryover left in the vessel is updated by using formulas of:

$$Vco'=(CDF-CDD)/CDF\times Vb$$

where CDD represents the concentration of the reagent during the draining, CDF represents the concentration of the reagent during the filling, and Vb represents the volume of the reagent bottle, Vco' represents the updated volume of carryover.

At step S214, it is determined whether the protocol is completely realized, if yes, the process is finished, otherwise step S215 is executed.

At step S215, a next reagent is picked for tissue processing.

In the process of obtaining a concentration of a reagent, the volume of carryover left in the vessel is dynamically adjusted for each round, such that the more accurate concentration of the reagent can be obtained.

Figure 3:
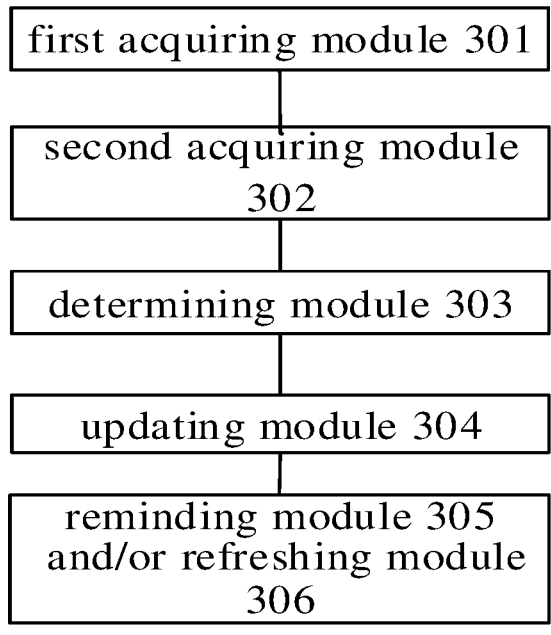
FIG. 3 is a block diagram of an apparatus for monitoring a concentration of a reagent according to some embodiments of the present disclosure.

Embodiments of the present disclosure further provide an apparatus for monitoring a concentration of a reagent. As illustrated in FIG. 3, the apparatus includes a first acquiring module 301, a second acquiring module 302, a determining module 303, an updating module 304, and a reminding module 305 and/or a refreshing module 306.

The first acquiring module 301 is configured to acquire a first concentration of a current reagent measured during filling of the current reagent with a preset concentration from a reagent bottle into a vessel via a liquid path.

The second acquiring module 302 is configured to acquire a current volume of carryover left in the vessel and the liquid path determined in a process of filling a previous reagent into the vessel and draining the previous reagent out from the vessel.

The determining module 303 is configured to acquire a second concentration of the current reagent measured during draining of the current reagent from the vessel to the reagent bottle via the liquid path, and determine, based on the preset concentration, a volume of the reagent bottle and the current volume of carryover, a third concentration of the current reagent after the current reagent is drained out from the vessel to the reagent bottle.

The updating module 304 is configured to update the current volume of carryover left in the vessel and the liquid path based on the first concentration, the second concentration and the volume of the reagent bottle.

The reminding module 305 is configured to remind a user to replace the current reagent when the third concentration is less than a preset concentration limit.

The refreshing module 306 is configured to refresh the current reagent with a higher concentrated reagent.

With the apparatus for monitoring the concentration of the reagent, the first concentration of the current reagent measured during filling of the current reagent with the preset concentration from the reagent bottle into the vessel via the liquid path can be acquired, and the current volume of carryover left in the vessel and the liquid path determined in the process of filling the previous reagent into the vessel and draining the previous reagent out from the vessel can be acquired, then the second concentration of the current reagent measured during draining of the current reagent from the vessel to the reagent bottle via the liquid path can be acquired and the third concentration of the current reagent after the reagent is drained out from the vessel to the reagent bottle can be determined based on the preset concentration, the volume of the reagent bottle and the current volume of the carryover and the current volume of the carryover left in the vessel and the liquid path can be updated based on the first concentration, the second concentration and the volume of the reagent bottle, when the third concentration is less than the preset concentration limit, the user is reminded to replace the current reagent. In this way, the volume of the carryover left in the vessel can be updated dynamically, such that the concentration of the reagent can be determined accurately in real time to remind the user to replace the reagent in time, thus improving the quality of tissue processing.

In some embodiments, the determining module 303 includes: a first determining unit, a control unit and a second determining unit. The first determining unit is configured to, after the current reagent is filled into the vessel, determine a concentration of the current reagent in the vessel based on the preset concentration, the volume of the reagent bottle and the current volume of carryover. The control unit is configured to, after the current reagent is drained out from the vessel to the reagent bottle, control the reagent bottle to be supplemented with the current reagent having a preset concentration. The second determining unit is configured to determine the third concentration of the current reagent in the reagent bottle based on the concentration of the current reagent in the vessel, the volume of the reagent bottle, the preset concentration and the current volume of carryover.

In some embodiments, the first determining unit includes a first calculating sub module and a second calculating sub module. The first calculating sub module is configured to calculate a volume of major component of the current reagent in the vessel using a formula of $Vaf=(Vb-Vco)\times Cbf$. The second calculating sub module is configured to calculate the concentration of the current reagent in the vessel using a formula of $Caf=Vaf\div Vb$; where Vaf represents the volume of major component of the current reagent in the vessel, Vco represents the current volume of carryover, Vb represents the volume of the reagent bottle, and Cbf represents the preset concentration, Caf represents the concentration of the current reagent in the vessel.

In some embodiments, the second determining unit includes a third calculating sub module and a fourth calculating sub module. The third calculating sub module is configured to calculate a volume of major component of the current reagent in the reagent bottle using a formula of $Vad=(Vb-Vco)\times Caf+Vco\times Cbf$. The fourth calculating sub module is configured to calculate the third concentration of the current reagent in the reagent bottle using a formula of $Cad=Vad\div Vb$; where Vad represents the volume of major component of the current reagent in the reagent bottle, Vco represents the current volume of carryover, Vb represents the volume of the reagent bottle, and Cbf represents the preset concentration, Caf represents the concentration of the current reagent in the vessel, and Cad represents the third concentration.

In some embodiments, the updating module includes a third determining unit, a fourth determining unit, and a replacing unit. The third determining unit is configured to determine an updated volume of carryover using a formula of: $Vco'=(CDF-CDD)/CDF\times Vb$; where $Vco'$ represents the updated volume of carryover, CDD represents the second concentration of the current reagent, CDF represents the first concentration of the current reagent, and Vb represents the volume of the reagent bottle. The replacing unit is configured to replace the current volume of carryover with the updated volume of carryover.

In some embodiments, the current reagent is selected from Ethanol and Xylene.

Regarding the device in the above embodiments, specific manners in which each module performs operations have been described in detail in the embodiments of the method, and will not be described in detail here.

The present disclosure also provides an equipment for monitoring a concentration of a reagent. The equipment may include a controller, a cache, a processor and a density meter. The density meter is configured to measure a concentration of a reagent during a filing and a second concentration of the reagent during a draining. The controller is configured to control a reagent to be filled in a vessel from a reagent bottle via a liquid path, and to control the reagent to be drained out from the vessel to the reagent bottle via the liquid path. In some embodiments, the controller may be further configured to control the reagent bottle to be supplemented with a reagent with a preset concentration. The cache may be configured to cache parameters including the preset concentration, a water concentration, a volume of the reagent bottle, a current volume of carryover left in the vessel. The processor may be configured to acquire a concentration of a concentration of a reagent measured by the density meter during filling of the reagent from the reagent bottle in the vessel, acquire acquired parameters including the current volume of carryover left in the vessel, the volume of the reagent bottle, the water concentration, the preset concentration from the cache, acquire a concentration of the reagent measured during the draining, determined a concentration of the reagent after the reagent is drained out from the vessel to the reagent bottle based on the preset concentration, the volume of the reagent bottle and the current volume of carryover, determine an updated current volume of carryover based on the concentration measured during the filling, the concentration measured during the draining and the volume of the reagent bottle, and replace the current volume of carryover saved in the cache with the updated current volume of carryover. Further, the processor is configured to remind a user to replace the reagent and/or refresh the current reagent with a higher concentrated reagent when the concentration of the reagent is less than a preset concentration limit.

Figure 4:
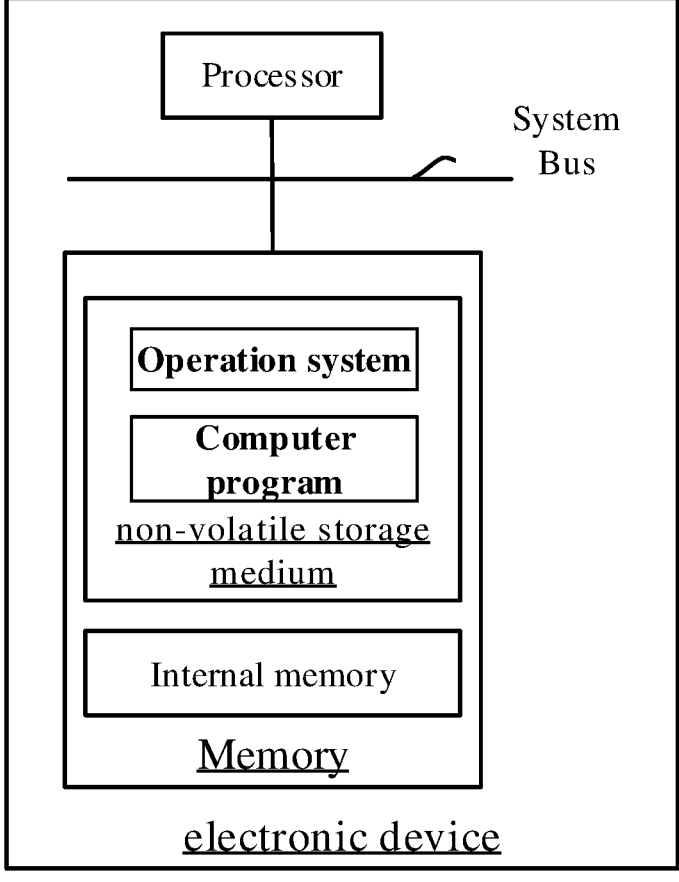
FIG. 4 is a block diagram of an electronic device according to some embodiments of the present disclosure.

FIG. 4 is a schematic diagram of an internal structure of an electronic device according to an embodiment of the present disclosure. As illustrated in FIG. 4, the electronic device includes a processor and a memory connected by a system bus. The processor is used to provide computing and control capabilities to support operations of the entire electronic device. The memory may include a non-volatile storage medium and an internal memory. The non-volatile storage medium stores an operating system and computer programs. The computer program is executed by the processor to implement the method for monitoring a concentration of a reagent according to the embodiments of the present disclosure. The internal memory provides a cached operating environment for the operating system and the computer programs in the non-volatile storage medium. The electronic device may be a mobile phone, a tablet computer, a personal digital assistant or a wearable device.

Each module in the apparatus for monitoring a concentration of a reagent according to the embodiments of the present disclosure may be implemented in the form of a computer program. When the computer program is executed by the processor, the steps of the method according to the embodiments of the present disclosure are implemented.

The embodiments of the present disclosure also provide a computer-readable storage medium containing computer-executable instructions, when the computer-executable instructions are executed by the one or more processors, the one or more processors are caused to perform the steps of the method for monitoring a concentration of a reagent according to the embodiments of the present disclosure.

A computer program product containing instructions is provided. When the instructions are running on a computer, the computer is caused to perform the method for monitoring a concentration of a reagent according to the embodiments of the present disclosure.

Any reference to memory, storage, database, or other media used in this application may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. Volatile memory can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ES-DRAM), synchronous Link (Synchlink) DRAM (SL-DRAM), memory bus (Rambus) direct RAM (RDRAM), direct memory bus dynamic RAM (DRDRAM), and memory bus dynamic RAM (RDRAM).

The preferred embodiments of the present disclosure have been described in detail above in conjunction with the accompanying drawings; however, the present disclosure is not limited to the particular details in the above embodiments. Within the scope of technical concept of the present disclosure, various simple modifications may be made to the technical solutions of the present disclosure. These simple modifications all belong to the protection scope of the present disclosure.

In addition, it should be noted that the particular technical features described in the foregoing particular embodiments may be combined in any suitable manner without contradiction. In order to avoid unnecessary repetition, various possible combinations are not further explained in this disclosure.

In addition, various embodiments of the present disclosure can also be arbitrarily combined, as long as it does not violate the idea of the present disclosure, and it should also be regarded as the content disclosed in the present disclosure.

What is claimed is:

1. A computer-implemented method for monitoring a concentration of a reagent, comprising:

acquiring, by a processor, a first concentration of a current reagent measured by a density meter during filling of the current reagent with a preset concentration from a reagent bottle into a vessel via a liquid path, the density meter operatively connected to the processor;

acquiring, by the processor, a current volume of carryover left in the vessel and the liquid path determined in a process of filling a previous reagent into the vessel and draining the previous reagent out from the vessel;

acquiring, by the processor, a second concentration of the current reagent measured by the density meter during draining of the current reagent from the vessel to the reagent bottle via the liquid path;

determining, by the processor and based on the preset concentration, a volume of the reagent bottle and the current volume of carryover, a third concentration of the current reagent after the current reagent is drained out from the vessel to the reagent bottle;

updating, by the processor, the current volume of carryover left in the vessel and the liquid path based on the first concentration, the second concentration and the volume of the reagent bottle; and when the third concentration is less than a preset concentration limit, generating, by the processor, an electronic reminder signal reminding a user to replace the current reagent and/or refreshing the current reagent with a higher concentrated reagent.

2. The method of claim 1, wherein the determining, by the processor and based on the preset concentration, the volume of the reagent bottle and the current volume of carryover, the third concentration of the current reagent after the current reagent is drained out from the vessel to the reagent bottle comprises:

after the current reagent is filled into the vessel, determining a concentration of the current reagent in the vessel based on the preset concentration, the volume of the reagent bottle and the current volume of carryover;

after the current reagent is drained out from the vessel to the reagent bottle, controlling the reagent bottle to be supplemented with the current reagent having the preset concentration; and determining the third concentration of the current reagent in the reagent bottle based on the concentration of the current reagent in the vessel, the volume of the reagent bottle, the preset concentration and the current volume of carryover.

3. The method of claim 2, wherein the determining the concentration of the current reagent in the vessel based on the preset concentration, the volume of the reagent bottle and the current volume of carryover comprises:

calculating a volume of major component of the current reagent in the vessel using a formula of $Vaf=(Vb-Vco)\times Cbf$; and calculating the concentration of the current reagent in the vessel using a formula of $Caf=Vaf\div Vb$;

where Vaf represents the volume of major component of the current reagent in the vessel, Vco represents the current volume of carryover, Vb represents the volume of the reagent bottle, and Cbf represents the preset concentration, Caf represents the concentration of the current reagent in the vessel.

4. The method of claim 2, wherein the determining the third concentration of the current reagent in the reagent bottle based on the concentration of the current reagent in the vessel, the volume of the reagent bottle, the preset concentration and the current volume of carryover comprises:

calculating a volume of major component of the current reagent in the reagent bottle using a formula of $Vad=(Vb-Vco)\times Caf+Vco\times Cbf$; and calculating the third concentration of the current reagent in the reagent bottle using a formula of $Cad=Vad=Vb$;

where Vad represents the volume of major component of the current reagent in the reagent bottle, Vco represents the current volume of carryover, Vb represents the volume of the reagent bottle, and Cbf represents the preset concentration, Caf represents the concentration of the current reagent in the vessel, and Cad represents the third concentration.

5. The method of claim 1, wherein the updating, by the processor, the current volume of carryover left in the vessel and the liquid path based on the first concentration, the second concentration and the volume of the reagent bottle comprises:

calculating an updated volume of carryover using a formula of:

$$Vco'=(CDF-CDD)/CDF\times Vb$$

replacing the current volume of carryover with the updated volume of carryover;

where Vco' represents the updated volume of carryover, CDD represents the second concentration of the current reagent, CDF represents the first concentration of the current reagent, and Vb represents the volume of the reagent bottle.

6. The method of claim 1, wherein the current reagent is selected from a group consisting of Ethanol and Xylene.

7. An electronic device, comprising:

a processor;

a memory, configured to store instructions executable by the processor, wherein when the instructions are executed by the processor, the processor is caused to perform the method according to claim 1.

8. A non-transitory computer-readable medium having instructions stored thereon for execution by a processor to implement operations of the method according to claim 1.

9. The method of claim 1, wherein the reminder signal comprises at least one of a video signal, an audio signal, and a vibration signal.

10. An apparatus for monitoring a concentration of a reagent, comprising:

a processor;

a density meter operatively connected to the processor; and a memory including:

a first acquiring module, configured to cause the processor to acquire a first concentration of a current reagent measure by the density meter during filling of the current reagent with a preset concentration from a reagent bottle into a vessel via a liquid path;

a second acquiring module, configured to cause the processor to acquire a current volume of carryover left in the vessel and the liquid path determined in a process of filling a previous reagent into the vessel and draining the previous reagent out from the vessel;

a determining module configured to cause the processor to:

acquire a second concentration of the current reagent measured by the density meter during draining of the current reagent from the vessel to the reagent bottle via the liquid path, and determine, based on the preset concentration, a volume of the reagent bottle and the current volume of carryover, a third concentration of the current reagent after the current reagent is drained out from the vessel to the reagent bottle;

an updating module configured to cause the processor to update the current volume of carryover left in the vessel and the liquid path based on the first concentration, the second concentration and the volume of the reagent bottle; and a reminding module configured to cause the processor to generate an electronic reminder signal to remind a user to replace the current reagent when the third concentration is less than a preset concentration limit and/or a refreshing module, configured to refresh the current reagent with a higher concentrated reagent.

11. The apparatus of claim 10, wherein the determining module comprises:

a first determining unit, configured to, after the current reagent is filled into the vessel, determine a concentration of the current reagent in the vessel based on the preset concentration, the volume of the reagent bottle and the current volume of carryover;

a control unit, configured to, after the current reagent is drained out from the vessel to the reagent bottle, control the current reagent to be drained out from the vessel to the reagent bottle and control the reagent bottle to be supplemented with the current reagent having a preset concentration; and a second determining unit, configured to determine the third concentration of the current reagent in the reagent bottle based on the concentration of the current reagent in the vessel, the volume of the reagent bottle, the preset concentration and the current volume of carryover.

12. The apparatus of claim 11, wherein the first determining unit comprises:

a first calculating sub module, configured to calculate a volume of major component of the current reagent in the vessel using a formula of $Vaf=(Vb-Vco) \times Cbf$; and a second calculating sub module, configured to calculate the concentration of the current reagent in the vessel using a formula of $Caf=Vaf=Vb$;

where Vaf represents the volume of major component of the current reagent in the vessel, Vco represents the current volume of carryover, Vb represents the volume of the reagent bottle, and Cbf represents the preset concentration, Caf represents the concentration of the current reagent in the vessel.

13. The apparatus of claim 11, wherein the second determining unit comprises:

a third calculating sub module, configured to calculate a volume of major component of the current reagent in the reagent bottle using a formula of $Vad=(Vb-Vco) \times Caf+Vco \times Cbf$; and a fourth calculating sub module, configured to calculate the third concentration of the current reagent in the reagent bottle using a formula of $Cad=Vad=Vb$;

where Vad represents the volume of major component of the current reagent in the reagent bottle, Vco represents the current volume of carryover, Vb represents the volume of the reagent bottle, and Cbf represents the preset concentration, Caf represents the concentration of the current reagent in the vessel, and Cad represents the third concentration.

14. The apparatus of claim 10, wherein the updating module comprises:

a third determining unit, configured to determine an updated volume of carryover using a formula of:

$$Vco'=(CDF-CDD)/CDF \times Vb$$

a replacing unit, configured to replace the current volume of carryover with the updated volume of carryover;

where Vco' represents the updated volume of carryover, CDD represents the second concentration of the current reagent, CDF represents the first concentration of the current reagent, and Vb represents the volume of the reagent bottle.

15. The apparatus of claim 10, wherein the current reagent is selected from a group consisting of Ethanol and Xylene.

16. The apparatus of claim 10, wherein the reminder signal comprises at least one of a video signal, an audio signal, and a vibration signal.

17. An equipment for monitoring a concentration of a reagent, comprising: a density meter, a cache, a controller and a processor;

wherein the controller is configured to control a current reagent with a preset concentration to be filled into a vessel from a reagent bottle via a liquid path, and to control the current reagent to be drained out from the vessel to the reagent bottle via the liquid path;

the density meter is configured to measure a first concentration of the current reagent during the filling and a second concentration of the current reagent during the draining;

the cache is configured to cache parameters including the preset concentration, a volume of the reagent bottle, a current volume of carryover left in the vessel and the liquid path, and a preset concentration limit;

the processor is configured to:

acquire the first concentration of the current reagent measured during the filling;

acquire the preset concentration, the water concentration, the volume of the reagent bottle, the preset concentration limit, and the current volume of carryover left in the vessel from the cache;

acquire the second concentration of the current reagent measured during the draining;

determine a third concentration of the current reagent after the current reagent is drained out from the vessel to the reagent bottle based on the preset concentration, the volume of the reagent bottle and the current volume of carryover;

determine an updated current volume of carryover left in the vessel and the liquid path based on the first concentration, the second concentration and the volume of the reagent bottle, and replace the current volume of carryover saved in the cache with the updated current volume of carryover; and when the third concentration is less than the preset concentration limit, generate a reminder signal to remind a user to replace the current reagent and/or refresh the current reagent with a higher concentrated reagent.

18. The equipment of claim 17, wherein the reminder signal comprises at least one of a video signal, an audio signal, and a vibration signal.

* * * * *